US012109444B1

(12) United States Patent
Park (10) Patent No.: US 12,109,444 B1
(45) Date of Patent: *Oct. 8, 2024

(54) ELECTRIC VEHICLE CHARGER-MOUNTED TRANSFORMER

(71) Applicant: CHERYONG ELECTRIC CO.,LTD., Seoul (KR)

(72) Inventor: Jong Tae Park, Seoul (KR)

(73) Assignee: CHERYONG ELECTRIC CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,152

(22) Filed: Mar. 4, 2024

(30) Foreign Application Priority Data

Sep. 22, 2023 (KR) .................. 10-2023-0126966

(51) Int. Cl.
*H02J 7/00* (2006.01)
*A62C 3/16* (2006.01)
*B60L 53/30* (2019.01)
*B60L 53/60* (2019.01)
*G01C 21/34* (2006.01)

(52) U.S. Cl.
CPC .............. *A62C 3/16* (2013.01); *B60L 53/30* (2019.02); *B60L 53/60* (2019.02); *G01C 21/3446* (2013.01); *H02J 7/00304* (2020.01); *H02J 7/00309* (2020.01); *B60L 2210/30* (2013.01)

(58) Field of Classification Search
USPC ....................................................... 320/109
See application file for complete search history.

(56) References Cited

U.S. PATENT DOCUMENTS

2013/0033234 A1\* 2/2013 Koritarov ............... B60L 53/66
320/137
2015/0291043 A1\* 10/2015 Nam ..................... B60L 53/665
320/137

(Continued)

FOREIGN PATENT DOCUMENTS

KR 10-2013-0120230 A 11/2013
KR 10-2013-0134167 A 12/2013

(Continued)

OTHER PUBLICATIONS

KR Office Action dated Dec. 14, 2023 as received in Application No. 10-2023-0126966.

(Continued)

*Primary Examiner* — Samuel Berhanu
(74) *Attorney, Agent, or Firm* — Maschoff Brennan (57) ABSTRACT

The present invention is an electric vehicle charger-mounted transformer with a system that enables AC power generated from the lower voltage side of the transformer to be converted into electric vehicle charging power, and at the same time, the electric vehicle to be charged, and in more detail, an electric vehicle charger includes a slow-charging device and a fast-charging device, the slow-charging device and the fast-charging device are connected to automatic fire extinguishing devices, respectively, and the automatic fire extinguishing devices automatically operate when the automatic fire extinguishing devices detect that at least one of a temperature of the slow-charging device and a temperature of the fast-charging device rises above a given temperature or detect generation of smoke.

13 Claims, 6 Drawing Sheets

(56) References Cited

U.S. PATENT DOCUMENTS

2020/0108728 A1    4/2020   Kim et al.
2022/0305935 A1    9/2022   Kim et al.

FOREIGN PATENT DOCUMENTS

| KR | 10-1343184 B1 | 12/2013 |
| KR | 10-1466438 B1 | 11/2014 |
| KR | 10-2015-0125087 A | 11/2015 |
| KR | 10-1978133 B1 | 5/2019 |
| KR | 10-2002629 B1 | 7/2019 |
| KR | 10-2027983 B1 | 10/2019 |
| KR | 10-2020-0003318 A | 1/2020 |
| KR | 10-2023-0085738 A | 6/2023 |

OTHER PUBLICATIONS

KR Decision to Grant Dated Jan. 15, 2024 as received in Application No. 10-2023-0126966.

* cited by examiner

ELECTRIC VEHICLE CHARGER-MOUNTED TRANSFORMER

TECHNICAL FIELD

The present invention relates to an electric vehicle charger-mounted transformer, and in particular, it relates to an electric vehicle charger-mounted transformer with a system that enables AC power received at the lower voltage side of the transformer to be converted into electric vehicle charging power, and at the same time, the electric vehicle to be charged.

BACKGROUND ART

As the distribution of electric vehicles expands, the electric vehicle charging systems have played an important role. However, the existing electric vehicle charging systems have various problems, increasing the need for improvement in safety and efficiency.

First, the existing electric vehicle charging systems have a risk of fire spreading due to the insulating oil contained in the transformer when a fire occurs during charging. For this reason, damage to human life and property may be caused in the event of a fire due to the absence of fire extinguishing and spreading prevention systems.

In addition, during fast charging, the heat generated inside the charger may not be effectively emitted due to charging loss, so excessive heat can accumulate inside the charger. This may increase the risk of a charger failure or malfunction.

In addition, if the battery's current flows back during charging in the existing charging systems, the charger may abnormally operate, which may lead to damage to the charger and the electric vehicle.

In addition, an overcurrent blocking function is installed in the transformer in such an existing charging system, so when an overcurrent occurs during charging, the overcurrent is blocked only after the charger is damaged.

PRIOR ART

Patent (0001) Patent Publication No. 10-2018-0112994
(0002) Patent Publication No. 10-2023-0085738

SUMMARY OF THE INVENTION

Technical Problem

A technical problem to be solved by the present invention is to solve the above-described problems of the existing charging systems, and to provide an electric vehicle charger-mounted transformer that can perform the electric vehicle charging process more safely and efficiently.

Another technical problem to be solved by the present invention is to provide an electric vehicle charger-mounted transformer that can improve the safety and efficiency of electric vehicle charging through application of an automatic fire extinguishing system and a power-blocking system for fire prevention, air vents for improving heat emission, a current backflow prevention diode, and an overcurrent blocking function.

The technical tasks to be achieved in the present invention are not limited to the above-mentioned technical problems, and other technical tasks that are not mentioned will be clearly understood by a person having ordinary skill in the art to which the present invention belongs from the following disclosure.

Problem Solving Means

To achieve the technical tasks, an electric vehicle charger-mounted transformer according to the present invention is an electric vehicle charger-mounted transformer that converts AC power received at the lower voltage side of the transformer into electric vehicle charging power to charge the electric vehicle, in which an electric vehicle charger includes a slow-charging device and a fast-charging device, the slow-charging device and the fast-charging device are connected to automatic fire extinguishing devices, respectively, and the automatic fire extinguishing devices automatically operate when the automatic fire extinguishing devices detect that at least one of a temperature of the slow-charging device and a temperature of the fast-charging device rises above a given temperature or detect generation of smoke.

In addition, each of the automatic fire extinguishing devices may include a heat/smoke detector that detects heat or smoke generated from the slow-charging device and the fast-charging device, a fire extinguishing controller that blocks a power circuit of the slow-charging device and the fast-charging device based on information detected by the heat/smoke detector, and a fire extinguisher that operates according to the fire extinguishing controller.

Furthermore, the fire extinguisher may operate in a set time after the power circuit is blocked.

In addition, each of the automatic fire extinguishing device may operate by receiving power through the power circuit, and operates by receiving power from a separate rechargeable battery after the power circuit is blocked.

In addition, the given temperature may be 70° C.

In addition, a fire extinguishing agent of the automatic fire extinguishing devices may include at least one of fluoride, chlorine, bromine, and iodine in an amount of 90% or more.

In addition, the automatic fire extinguishing devices may be disposed inside a transformer enclosure, the electric vehicle charger may be disposed inside or outside the transformer enclosure, and many air vents may be provided in an upper part of a side of an enclosure of the electric vehicle charger.

In addition, a height of the air vents may be 10 to 30 mm and a lateral width of the air vents may be 50 to 200 mm.

In addition, the power circuit may be connected to a current backflow prevention diode, a capacity of the current backflow prevention diode may be 0.5 times or more a short-circuit current (Isc) and 0.6 times or more an open-circuit voltage (Voc).

In addition, a charging controller that controls the power circuit and output power may be disposed in each of the slow-charging device and the fast-charging device, the charging controller may adjust a charging speed and efficiency, and a current detector that blocks a current when an overcurrent occurs may be further disposed.

In addition, an automatic communication device that is connected to an emergency dispatch department through wired and/or wireless communication may be further provided, when at least one of the automatic fire extinguishing devices starts operating, the automatic communication device may also start operating to transmit a situation of a fire to the emergency dispatch department.

In addition, when a situation of a fire is transmitted to the emergency dispatch department, location information of the place where the fire has occurred and navigation information indicating the route on which the emergency dispatch department can arrive at the place of the fire in the shortest time may also be transmitted.

In addition, a visual display device that visually indicates an emergency and an audio display device that provides audio guidance on the emergency may be further included.

In addition, the automatic communication device may be connected to an emergency recovery department through wired and/or wireless communication, and when at least one of the automatic fire extinguishing devices starts operating, the automatic communication device may also start operating to transmit a situation of a fire to the emergency recovery department.

In addition, when a situation of a fire is transmitted to the emergency recovery department, location information of the place where the fire has occurred and navigation information indicating the route on which the emergency recovery department can arrive at the place of the fire in the shortest time may also be transmitted.

The above aspects of the present invention are merely a part of preferred embodiments of the present invention, and various embodiments reflecting the technical features of the present invention can be derived and understood by a person having ordinary skill in the art based on the detailed description of the present invention to be described below.

Effects of the Invention

The present invention described above has the following effects.

First, the present invention can prevent the spread of fire and improve safety. In other words, the automatic fire extinguishing system can quickly quench a fire occurring inside the charger by detecting smoke or heat, and at the same time, prevent the spread of the fire by blocking power. Halogenated compounds that are harmless to the environment and human bodies may be used as fire extinguishing agents, and electrically non-conductive materials may be additionally used to prevent electric shock accidents. The use of the materials may make it possible to respond quickly in the event of fire and to minimize damage to human life and property caused by the fire.

In addition, the present invention enables efficient management of charging loss. In other words, whereas heat generated in an existing charging system is accumulated inside the chargers due to the insufficient heat emission system, causing device failure and malfunction, the present invention can effectively emit heat resulting from charging loss through air vents. In addition, the appropriately set height, size, and angle of the air vents enable smooth emission of heat and prevent electrical accidents caused by the inflow of rainwater, dust, etc. This can improve the stability and reliability of the charging system.

In addition, the present invention can prevent current backflow and block overcurrent. In other words, the present invention can ensure stability of the charging process by having a current backflow prevention diode installed in the system so that the battery's current does not flow back while the electric vehicle is being charged. In addition, the overcurrent blocking function may be applied to the charger itself, so power can be immediately blocked when overcurrent occurs. Through this configuration, the protection of the charging systems and electric vehicles can be strengthened, and the risk of breakdown and damage can be reduced.

In addition, the present invention allows power to be efficiently managed. In other words, the present invention enables the charging speed and efficiency to be adjusted by adding a current detector to the charger. If the detector detects an overcurrent exceeding 1.5 times the battery voltage, the power can be immediately blocked to prevent failure. In addition, the process of charging an electric vehicle can be efficiently managed by optimizing the charging speed and efficiency.

Furthermore, the present invention provides an emergency situation response and communication function. In other words, the present invention may include an automatic communication device for communicating with the emergency dispatch department. In the event of a fire, as soon as the automatic fire extinguishing system starts operating, the emergency dispatch department receives transmission of the situation of the fire as well as navigation information indicating the route on which the emergency dispatch department can arrive at the place of the fire in the shortest time. In addition, visual and audio display devices can indicate emergency situations and provide audio guidance, and thereby the present invention can greatly improve the responding ability.

In addition, the present invention can reduce concern about environmental pollution and increase safety at the time of fire extinguishment by using an environmentally-friendly fire extinguishing agent, i.e., by using a halogenated compound that is harmless to the environment and human bodies.

Furthermore, the above-described effects may also contribute to the growth and expansion of the electric vehicle market by improving the safety, efficiency, and environmental compatibility of electric vehicle charging systems.

Effects that can be obtained from the present invention are not limited to the effects mentioned above, and other effects that are not mentioned will be clearly understood by a person having ordinary skill in the art to which the invention belongs from the following description.

DETAILED DESCRIPTION OF THE EMBODIMENTS

Some embodiments of the present invention will be described in detail below with reference to exemplary drawings. When it comes to reference numerals given to the components in each drawing, it should be noted that the same components are given the same reference numerals as much as possible even though the components are illustrated in different drawings.

In addition, when it comes to explanation of embodiments of the present invention, if it is determined that detailed explanation of a relevant known configuration or function interferes with the understanding of the embodiments of the present invention, detailed explanation thereof shall be omitted.

In addition, the terms "first," "second," "A," "B," "(a)," "(b)," etc. may be used to describe the components in the embodiments of the present invention. Such terms are intended only to distinguish the components from other components, and the nature, sequence, order, etc. of the components are not limited by the terms. If a component is described as being "connected to," "combined with," or "joined to" another component, it should be understood that the component may be directly linked or connected to the other component, however the components may be "connected to," "combined with," or "joined to" other respective components.

Figure 1:
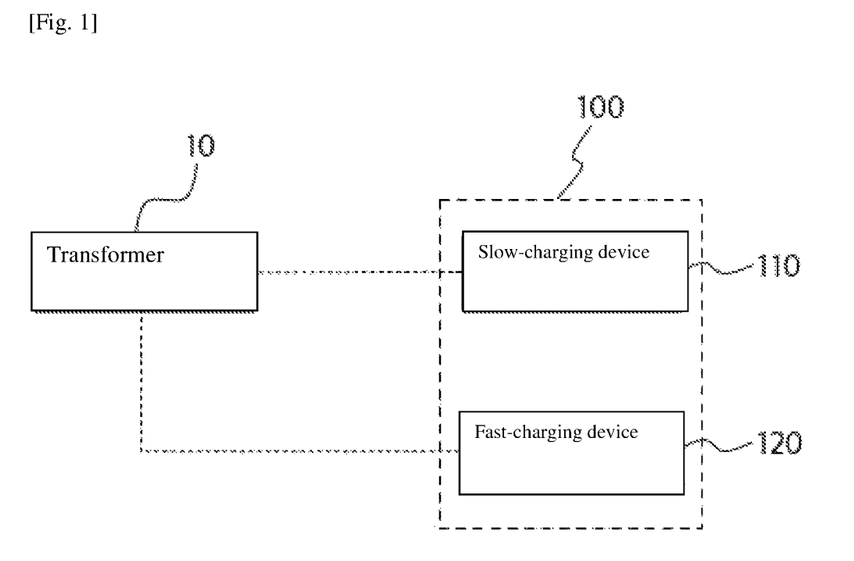
FIG. 1 is a conceptual configuration diagram of an electric vehicle charger-mounted transformer according to an embodiment of the present invention.
Figure 2:
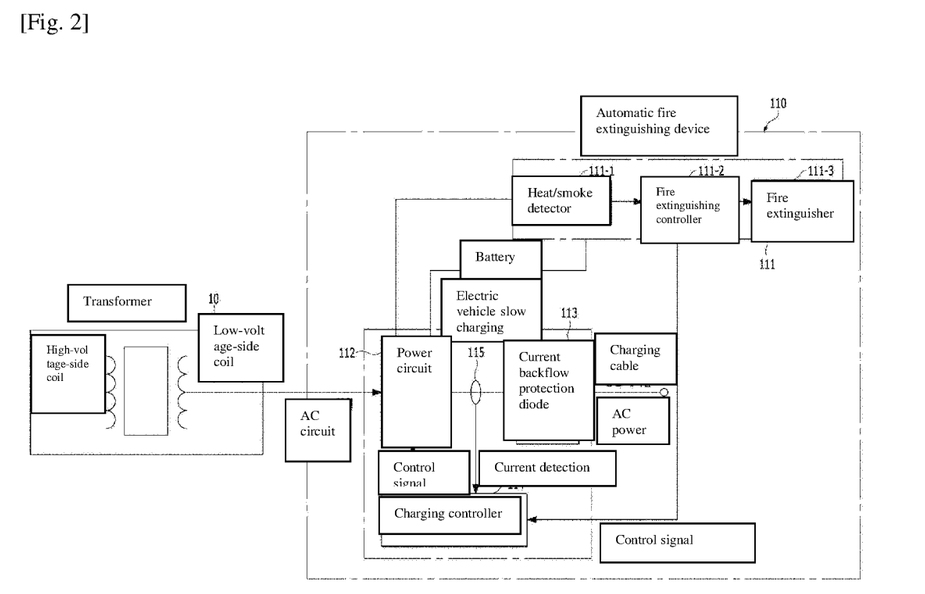
FIG. 2 is a conceptual diagram illustrating a state of connection of a low-voltage terminal and a slow-charging device of the electric vehicle charger-mounted transformer according to an embodiment of the present invention.
Figure 3:
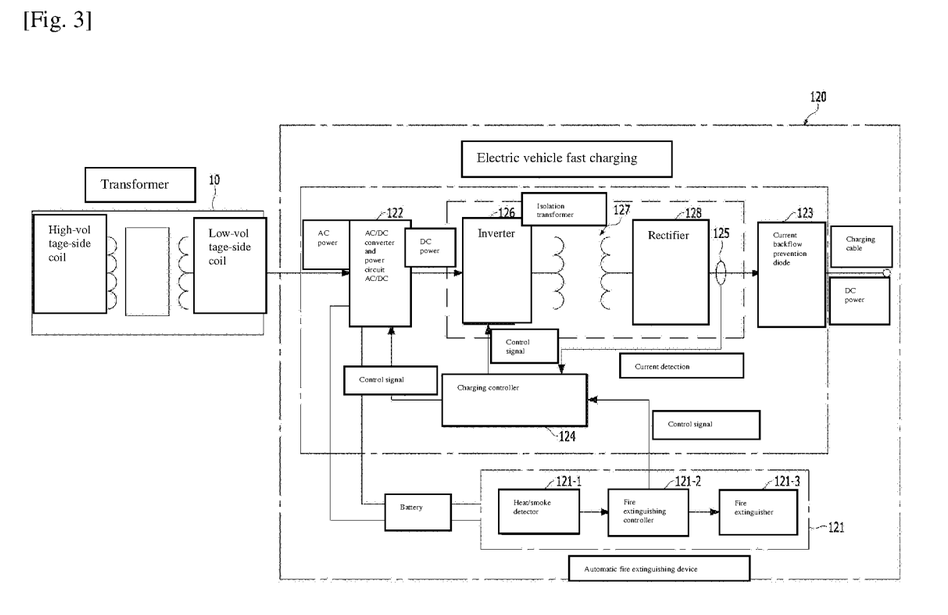
FIG. 3 is a conceptual diagram illustrating a state of connection of the low-voltage terminal and a fast-charging device of the electric vehicle charger-mounted transformer according to an embodiment of the present invention.
Figure 4:
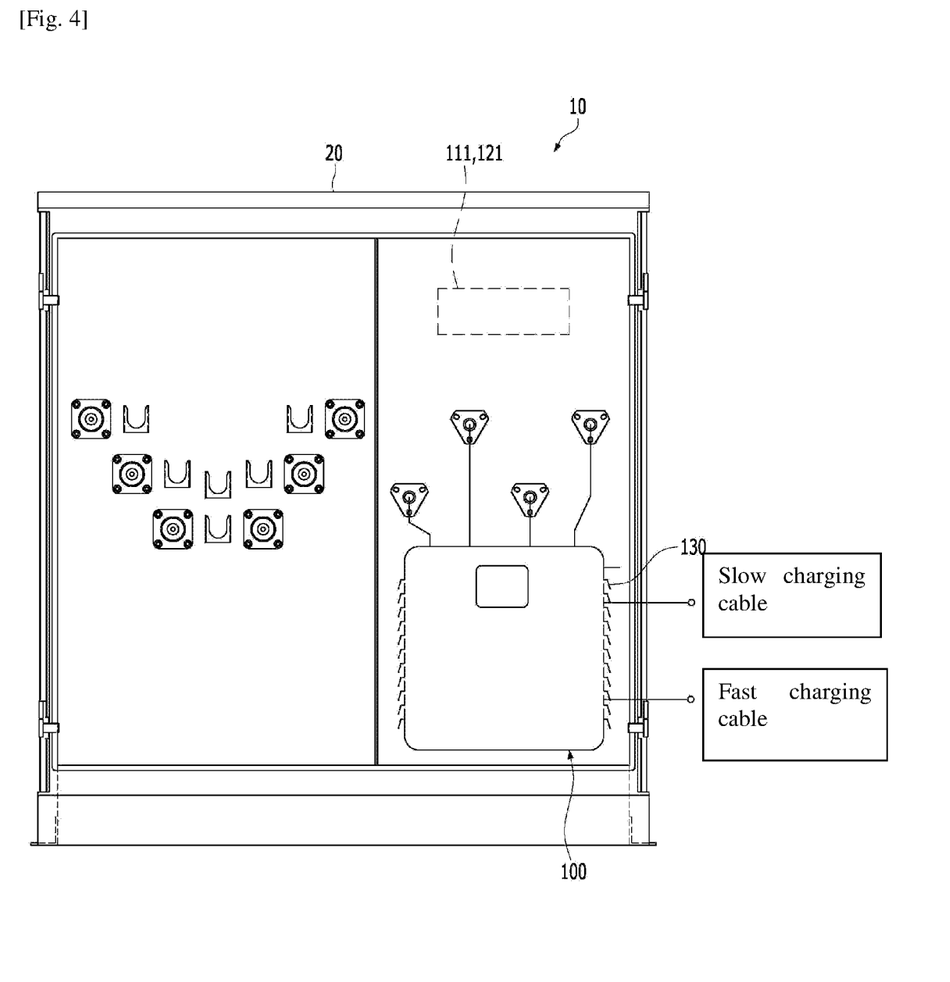
FIG. 4 is a conceptual diagram illustrating a structure of air vents of an electric vehicle charger disposed inside a transformer enclosure of the electric vehicle charger-mounted transformer according to an embodiment of the present invention.
Figure 5:
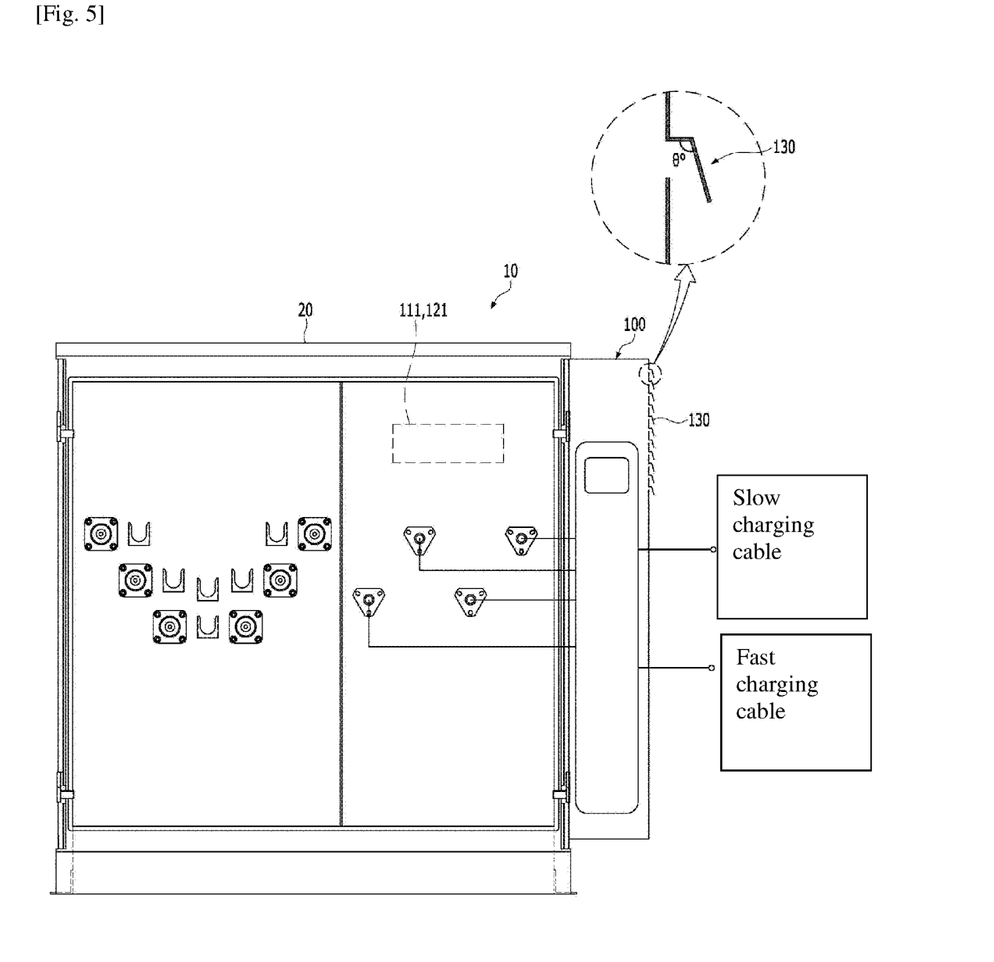
FIG. 5 is a conceptual diagram illustrating a structure of air vents of an electric vehicle charger disposed outside the transformer enclosure of the electric vehicle charger-mounted transformer according to an embodiment of the present invention.
Figure 6:
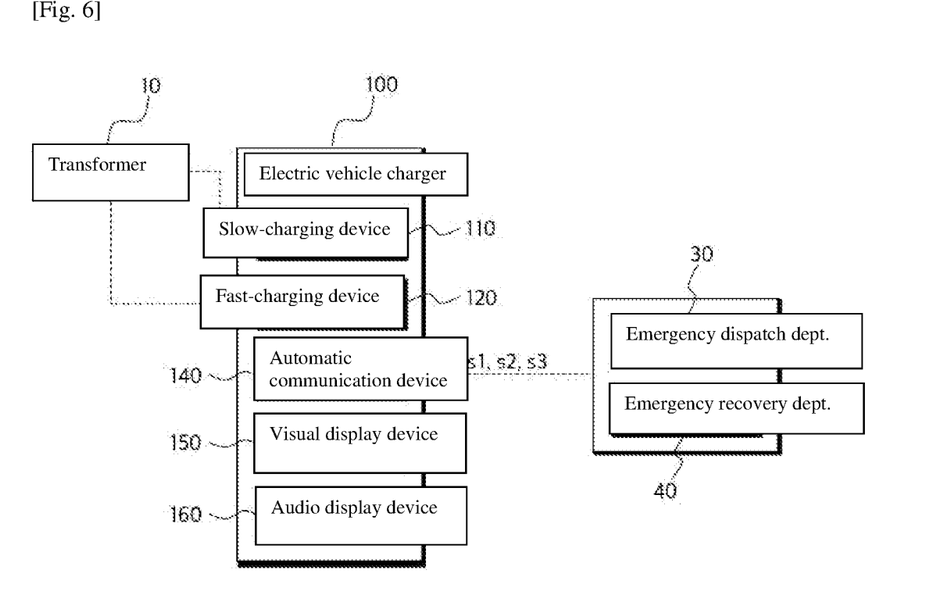
FIG. 6 is a conceptual configuration diagram of an electric vehicle charger-mounted transformer according to another embodiment of the present invention.

FIG. 1 is a conceptual configuration diagram of an electric vehicle charger-mounted transformer according to an embodiment of the present invention, FIG. 2 is a conceptual diagram illustrating a state of connection of a low-voltage terminal and a slow-charging device of the electric vehicle charger-mounted transformer according to an embodiment of the present invention, FIG. 3 is a conceptual diagram illustrating a state of connection of the low-voltage terminal and a fast-charging device of the electric vehicle charger-mounted transformer according to an embodiment of the present invention, FIG. 4 is a conceptual diagram illustrating a structure of air vents of an electric vehicle charger disposed inside a transformer enclosure of the electric vehicle charger-mounted transformer according to an embodiment of the present invention, FIG. 5 is a conceptual diagram illustrating a structure of air vents of an electric vehicle charger disposed outside the transformer enclosure of the electric vehicle charger-mounted transformer according to an embodiment of the present invention, and FIG. 6 is a conceptual configuration diagram of an electric vehicle charger-mounted transformer according to another embodiment of the present invention.

First, a structure of an electric vehicle charger-mounted transformer according to an embodiment of the present invention will be described below with reference to FIGS. 1 to 5.

The electric vehicle charger-mounted transformer, which is the present invention, is a transformer equipped with an electric vehicle charger for charging an electric vehicle by converting AC power received at the low voltage side of a transformer (10) into electric vehicle charging power.

The electric vehicle charger-mounted transformer, which is the present invention, may include the transformer (10) and an electric vehicle charger (100) connected to the transformer (10).

Examples of the transformer (10) may include all transformers placed at locations where electric vehicles can be charged, and for example, the transformer (10) can be configured as a ground transformer. The transformer (10) may be installed in a transformer enclosure (20).

The electric vehicle charger (100) includes a slow-charging device (110) and a fast-charging device (120), and automatic fire extinguishing devices (111 and 121) may be connected to each of the slow-charging device (110) and the fast-charging device (120).

Referring to FIG. 2, the slow-charging device (110) may be connected to the low voltage side of the transformer (10). The slow-charging device (110) may receive application of AC power at the low voltage side of the transformer (10) through a power circuit (112). The power circuit (112) may convert the applied AC power into a voltage and a current at a required level through a power converter. The power circuit (112) may include a power control unit (not illustrated). The power control unit may monitor the charging process, adjust the charging speed, detect and adjust overcurrent and overvoltage, and block the system. In addition, the power circuit (112) may include various protective devices to prevent fire, overheating, short circuits, overvoltage, etc. that may occur during charging. The power circuit (112) may be configured as a module.

The voltage and current converted by the power circuit (112) may be supplied to the electric vehicle through a charging cable, to the slow-charging device (110), or to the automatic fire extinguishing device (111).

The automatic fire extinguishing device (111) may include a heat/smoke detector (111-1), a fire extinguishing controller (111-2), and a fire extinguisher (111-3).

The heat/smoke detector (111-1) may include sensors for detecting heat and smoke. In the event of fire, the heat/smoke detector (111-1) can activate the automatic fire extinguishing device (111) by detecting increasing smoke or heat and converting the detection result into a signal.

In such a case, basically, the heat/smoke detector can detect heat of 70 degrees or higher, and can be configured to detect heat of 70 to 100 degrees. The heat/smoke detector has a possibility of operating under daily use conditions if it detects heat of below 70 degrees, and if the heat/smoke detector detects heat of above 100 degrees, there is a high possibility of the fire having passed the initial fire control stage and not being extinguished by the automatic fire extinguishing device (111).

Smoke may be detected by using a light emitting device that emits light and a photoelectric device that converts light into electricity in a way that, when smoke enters in the event of fire, light emitted from the light emitting device scatters, and the photoelectric device senses the scattered light to amplify a signal, and then a fire alarming signal is transmitted to activate the automatic fire extinguishing device (111).

The fire extinguishing controller (111-2) can analyze the signal received from the heat/smoke detector (111-1) and control the operating state of the fire extinguisher based on the analyzed results.

In the event of fire, the fire extinguisher (111-3) may spray the fire extinguishing agent to suppress the fire. Halogenated compounds that are harmless to the environment and human bodies are used as fire extinguishing agents, and an electrically non-conductive material to prevent electric shock accidents may be included. The fire extinguishing agent of the automatic fire extinguishing device (110) may include at least one of the environmentally friendly materials, such as fluoride, chlorine, bromine, and iodine, in an amount of 90% or more.

The fire extinguisher (111-3) can detect increasing smoke and heat, and then automatically spray the fire extinguishing agent to suppress the fire.

In other words, in the automatic fire extinguishing device (111), the heat/smoke detector (111-1) detects smoke or heat at the initial stage of fire, and the detected fire information is transmitted from the heat/smoke detector (111-1) to the fire extinguishing controller (111-2). The fire extinguishing controller (111-2) analyzes the transmitted information and activates the fire extinguisher (111-3) if necessary. When fire is detected and the fire extinguisher (111-3) is activated, the fire extinguishing agent is sprayed to suppress the fire and further can prevent a greater disaster.

In the meantime, in the event of fire, the supply of power through the power circuit (112) may be blocked, and the automatic fire extinguishing device (111) may operate by receiving power from a separate battery (whose reference numeral is not indicated). The above-mentioned battery can be configured to be charged by receiving power from the power circuit (112) in normal times, and to supply power to the automatic fire extinguishing devices only in an emergency situation such as a fire.

The slow-charging device (110) may include a charging cable (whose reference numeral is not indicated) for connection to the electric vehicle. The charging cable may be responsible for transmission of electricity and data between the electric vehicle and the slow-charging device.

A charging controller (114) can monitor and control the charging process. The charging controller (114) can adjust a charging speed and electricity to be optimal by detecting the charging state, the battery capacity, etc. of the electric vehicle. In addition, a charging time may be reserved or a charging mode set by the user may be managed.

In the event of fire, the charging controller (114) may receive information about the occurrence of the fire from the fire extinguishing controller (111-2) and operate to block the supply of power through the power circuit (112). In other words, since an automatic power blocking system is applied to prevent the spread of fire, when a fire breaks out in the slow-charging device (110), the fire can be prevented from spreading by the charging controller (114) that expects fire through detection of smoke and heat and blocks the power circuit (112).

The present invention can further increase safety through the simultaneous operation of the double system including the automatic fire extinguishing device (111) and the aforementioned automatic power blocking system.

Meanwhile, the system may be configured such that the automatic fire extinguishing device (111) starts operating in a set time after the above-mentioned automatic power blocking system operates, for example, 5 seconds. The reason for this configuration is that, when the automatic fire extinguishing device (111) operates first, there is a possibility of the automatic power blocking system not properly operating due to failure of the charging controller (114) caused by the fire extinguishing agent.

In addition, the automatic fire extinguishing device (111) may be equipped with a separate battery that can supply power for 5 to 10 minutes so that the automatic fire extinguishing device (111) can operate even after the power is cut off.

A current detector (115) can monitor and manage the current generated during charging. When overcurrent occurs, the current detector (115) may stop the charging operation and block the supply of power for system safety. In other words, when overcurrent occurs, the charging controller (114) may detect information about the occurrence, and the charging controller (114) may block the power circuit (112).

It is desirable that the current detector (115) be installed in the slow-charging device (110), not on the transformer (10) side. The current detector (115) can control the charging speed and efficiency through the charging controller (114), and at the same time, prevent damage to the slow-charging device (110) and the electric vehicle by blocking the current in a short period of time when overcurrent occurs during charging. In other words, if the overcurrent blocking function is provided on the transformer (10) side, not on the slow-charging device (110) side, there is a high possibility of the slow-charging device (110) being damaged before the transformer (10) blocks the current when overcurrent occurs during charging. Meanwhile, if a voltage detected by the current detector (115) exceeds 1.5 times the battery voltage, it can be determined as overcurrent.

The user may connect the electric vehicle to the slow-charging device (110) by using a charging cable.

When the electric vehicle requests slow charging, the charging controller (114) controls the charging operation. The charging request may be made through communication between the charging port of the electric vehicle and the slow-charging device (110).

The charging controller (114) may determine the electricity and current required for charging, taking the current battery condition of the electric vehicle and the charging mode requested by the user into account. This enables the charging speed to be adjusted and the battery to be charged safely.

Once the charging is completed, the charging controller (114) may stop charging and transmit a notification to the user. The notification may be transmitted to the user through a display device, a speaker, etc., and the user having received the notification may remove the charging cable to use the electric vehicle.

Meanwhile, the power circuit (112) may be connected to a current backflow prevention diode (113). It is desirable that the capacity of the current backflow prevention diode (113) be 0.5 times or more the short circuit current (Isc) and 0.6 times or more an open-circuit voltage (Voc). In this case, if the capacity of the current backflow prevention diode (113) is less than 0.5 times the short-circuit current or less than 0.6 times the open-circuit voltage, the efficiency of current backflow prevention may deteriorate.

Next, the fast-charging device (120) will be described.

However, since the basic connection configuration and the operating status of the fast-charging device (120) are the same as those of the slow-charging device (110), the above description of the slow-charging device (110) shall be referred to, and thus only a brief explanation will be made. In addition, since the components such as an AC/DC converter, an inverter (126), an isolation transformer (127), and a rectifier (128) constituting the fast-charging device (120) are known technologies, only the connection states thereof will be briefly described.

Referring to FIG. 3, the fast-charging device (120) may also be connected to the low voltage side of the transformer (10). The fast-charging device (120) can also receive application of AC power at the low voltage side of the transformer (10) through a power circuit (122). The power circuit (122) may convert the applied AC power into a voltage and a current at a required level through a power converter. The power circuit (122) may be equipped with an AC/DC converter, which can convert AC power into DC power and transmit the converted power to the inverter (126). The inverter (126) may be connected to the rectifier (128) through the isolation transformer (127). The rectifier (128) may be connected to the current backflow prevention diode (123). In addition, a current detector (125) may be connected to detect the current flowing from the rectifier (128) to the current backflow prevention diode (123), and the current detector (125) may be connected to a charging controller (124).

The power circuit (122) may include a power control unit (not illustrated).

The voltage and current converted by the power circuit (122) may be supplied to the electric vehicle through a charging cable, to the fast-charging device (120), or to the automatic fire extinguishing device (121).

The automatic fire extinguishing device (121) may include a heat/smoke detector (121-1), a fire extinguishing controller (121-2), and a fire extinguisher (121-3).

In the meantime, in the event of fire, the supply of power through the power circuit (122) may be blocked, and the automatic fire extinguishing device (121) may operate by receiving power from a separate battery (whose reference numeral is not indicated). The above-mentioned battery may be configured to be charged by receiving power from the power circuit (122) in normal times, and to supply power to the automatic fire extinguishing device (121) only in an emergency situation such as fire.

The fast-charging device (120) may include a charging cable (whose reference numeral is not indicated) for connection to the electric vehicle. The charging cable may be responsible for transmission of electricity and data between the electric vehicle and the fast-charging device.

The charging controller (124) may monitor and control the fast-charging process.

The fast-charging device (120) may also be equipped with the automatic power blocking system.

The current detector (115) may monitor and manage the current generated during charging. When overcurrent occurs, the current detector (115) may stop the charging operation and block the supply of power for system safety.

The user may connect the electric vehicle to the fast-charging device (120) by using a charging cable.

When the electric vehicle requests fast charging, the charging controller (124) controls the charging operation.

Once the charging is completed, the charging controller (124) may stop the charging and transmit a notification to the user.

The electric vehicle charger (100) may be disposed inside the transformer enclosure (20) in which the transformer is installed as illustrated in FIG. 4, or the electric vehicle charger (100) may be disposed outside the transformer enclosure (20) in which the transformer is installed as illustrated in FIG. 5.

When the electric vehicle charger (100) is disposed inside the transformer enclosure (20) in which the transformer is installed, at least one of the automatic fire extinguishing devices (111 and 121) may be installed not only in the electric vehicle charger (100) but also inside the transformer enclosure (20).

In addition, when the electric vehicle charger (100) is disposed outside the transformer enclosure (20) in which the transformer is installed, at least one of the automatic fire extinguishing devices (111 and 121) may be installed not only in the electric vehicle charger (100) but also inside the transformer enclosure (20). The automatic fire extinguishing device (111 or 121) disposed inside the transformer enclosure (20) can also operate in the same manner as the automatic fire extinguishing device disposed in the electric vehicle charger (100) to suppress the fire inside the transformer enclosure (20).

The electric vehicle charger may be installed in the transformer enclosure, and many air vents (130) may be disposed on an upper part of a side of an enclosure of the electric vehicle charger. At the time of fast charging, excessive heat is generated due to about 26.8% more charging loss compared to slow charging in the process of converting AC power to DC power inside the electric vehicle charger (100). In such a case, in the related art, the excessive heat is cooled only by using the cooling fan disposed inside the system without an air vent structure to dissipate the heat to the outside, and thus this situation may increase a possibility of device failure and malfunctions caused by heat stagnating when the cooling fan is out or order. Therefore, in the present invention, extra air vents (130) may be applied to increase cooling efficiency.

At this time, it is desirable that a height of the air vents (130) be 10 to 30 mm and a lateral width of the air vents (130) be 50 to 200 mm.

If the height and the lateral width of the air vents (130) are less than 10 mm and 50 mm, respectively, heat is not properly emitted and becomes stagnant, and if the height and the lateral width of the air vents (130) are larger than 30 mm and 200 mm, respectively, there is a high possibility of an electrical accident occurring due to the inflow of rainwater and dust.

In addition, it is desirable for the air vents to have an angle ($\theta°$) in the range from 30 to 50 degrees. If the air vents have an angle ($\theta°$) lower than 30 degrees, the heat is not properly emitted and becomes stagnant, and if the air vents have an angle ($\theta°$) higher than 50 degrees, there is a high possibility of an electric accident occurring due to the inflow of rainwater and dust.

FIG. 5 is a conceptual configuration diagram of an electric vehicle charger-mounted transformer according to another embodiment of the present invention, and configurations and operation statuses according to other embodiments will be described with reference to the drawing. In addition, FIGS. 1 through 4 may be referred to together for the reference numerals, etc.

The electric vehicle charger (100) according to the present invention may be equipped with an automatic communication device (140) connected to the emergency dispatch department (30) through wired and/or wireless communication. When at least one of the automatic fire extinguishing devices (111 and 121) starts operating, the automatic communication device (140) may also start operating to transmit the situation of the fire to the emergency dispatch department (30).

The emergency dispatch department (30) is a department organized to respond to various emergency situations, and may play a role in responding to various urgent situations such as fire, accidents, and emergency situations. The emergency dispatch department (30) may be a fire department, an emergency medical department, a police station, a rescue squad, a coastguard, a forest fire brigade, an emergency communication and control center, marine police, an environment management department, an emergency shelter, and a relief agency.

In addition, when a situation of a fire is transmitted to the emergency dispatch department (30), location information (s1) of the place where the fire has occurred and navigation information (s2) indicating the route on which the emergency dispatch department (30) can arrive at the place of the fire in the shortest time may also be transmitted.

The location information (s1) of the place where the fire has occurred allows clear understanding of the relationship between the place where the electric vehicle charger is located and the place of the fire, and the navigation information (s2) indicating the route on which the emergency dispatch department (30) can arrive at the place of the fire in the shortest time enables the emergency dispatch department (30) to quickly move and respond to the fire.

Furthermore, a visual display device (150) that visually indicates an emergency and an audio display device (160) that provides audio guidance on the emergency may be further included.

The visual display device (150) may include a display device that displays various messages and images representing an emergency. The visual display device may be used to visually convey information in the event of an emergency.

In addition, a variety of colors and effects may be used to indicate different circumstances. For example, red may indicate a fire, and yellow may indicate an alert.

In addition, visibility can be optimized according to the surrounding lighting conditions by adjusting the brightness of the visual display device.

In addition, emergency information may be provided by using text messages and icons depending on the situation.

The audio display device (160) may include a speaker that reproduces voice messages related to emergency situations. Due to this configuration, pre-recorded voice messages may be stored and reproduced necessary in preparation for various urgent situations.

In addition, when a system that detects emergency situations is activated, a voice message that matches the situation can be automatically reproduced.

In addition, voice messages may be provided in various languages and can be easily understood by adjusting their pronunciation and accents.

The visual display device (150) and the audio display device (160) can help strengthen safety by providing quick and clear guidance to people in emergency situations. These devices can be adapted to various environments and situations, and enable prompt responses to emergency situations.

Meanwhile, the automatic communication device (140) is also connected to an emergency recovery department (40) through wired and/or wireless communication, and when at least one of the automatic fire extinguishing devices (111 and 121) starts operating, the automatic communication device (140) may also start operating to transmit the situation of the fire to the emergency recovery department (40).

The emergency recovery department (40) may consist of an electrical team and a communication team to swiftly repair or replace the transformer (10) and the electric vehicle charger.

In addition, when a situation of a fire is transmitted to the emergency recovery department (40), location information (s1) of the place where the fire has occurred and navigation information (s3) indicating the route on which the emergency recovery department (40) can arrive at the place of the fire in the shortest time can also be transmitted, which makes rapid mobility and support possible.

The above-described present invention may not only improve the safety, efficiency, and environmental compatibility of the electric vehicle charging system but also contribute to the growth and expansion of the electric vehicle market.

In the foregoing, even though all elements constituting an embodiment of the present invention have been described as combining or operating in combination with one another, the prevent invention is not necessarily limited to such an embodiment. In other words, all of the components may be selectively combined and operate with one or more elements within the scope of the gist of the present invention. In addition, the terms "include," "compose," or "have" above mean that the relevant component can be embedded unless otherwise stated, so it should be interpreted that other components can be added rather than excluding them. All terms including technical or scientific terms, unless otherwise defined, shall have the same meaning as is generally understood by a person with ordinary skill in the art to which the invention pertains. Generally used terms, such as those defined in advance, shall be construed to correspond to the contextual meaning of the relevant technology, and shall not be construed as an ideal or excessively formal meaning unless clearly defined in the present invention.

The foregoing description is merely an exemplary description of the technical idea of the present invention, and a person having ordinary skill in the art to which the present disclosure pertains will be able to make various modifications and variations to the extent that they do not deviate from the essential characteristics of the invention. Therefore, the embodiments disclosed in the present invention are not intended to limit the technical idea of the present invention, but are intended to explain it, and the scope of the technical concept of the invention is not limited by such embodiments. The scope of protection of the present invention shall be construed in accordance with the following claims, and all technical ideas within the scope equivalent thereto shall be interpreted as being included in the scope of rights of the present invention.

DESCRIPTION OF SYMBOLS

10: Transformer
20: Transformer enclosure
30: Emergency dispatch department
40: Emergency recovery department
100: Electric vehicle charger
110: Slow-charging device
111: Automatic fire extinguishing device
111-1: Heat/smoke detector
111-2: Fire extinguishing controller
111-3: Fire extinguisher
112: Power circuit
113: Current backflow prevention diode
114: Charging controller
115: Current detector
120: Fast-charging device
121: Automatic fire extinguishing device
121-1: Heat/smoke detector
121-2: Fire extinguishing controller
121-3: Fire extinguisher
122: Power circuit
123: Current backflow prevention diode
124: Charging controller
125: Current detector
126: Inverter
127: Isolation transformer
128: Rectifier
130: Air vent
140: Automatic communication device
150: Visual display device
160: Audio display device

What is claimed is:

1. An electric vehicle charger-mounted transformer configured to
   convert AC power received at a lower voltage side of the transformer into electric
   vehicle charging power to charge an electric vehicle,
      wherein the electric vehicle charger including
      a slow-charging device;
      a fast-charging device; and an automatic communication device connected to an emergency dispatch department through wired and/or wireless communication, the slow-charging device and the fast-charging device are connected to automatic fire extinguishing devices, respectively, the automatic fire extinguishing devices automatically operate when the automatic fire extinguishing devices detect that at least one of a temperature of the slow-charging device and a temperature of the fast-charging device rises above a given temperature or detect generation of smoke, when at least one of the automatic fire extinguishing devices starts operating, the automatic communication device also starts an operate to transmit a situation of a fire to the emergency dispatch department, and when the situation of the fire is delivered to the emergency dispatch department, location information of the place where the fire has occurred and navigation information indicating a route on which the emergency dispatch department can arrive at the place of the fire in the shortest time can also be delivered.

2. The electric vehicle charger-mounted transformer according to claim 1, wherein each of the automatic fire extinguishing devices includes a heat/smoke detector configured to detect heat or smoke generated from the slow-charging device and the fast-charging device;

a fire extinguishing controller configured to block a power circuit of the slow-charging device and the fast-charging device based on information detected by the heat/smoke detector; and a fire extinguisher configured to operate according to the fire extinguishing controller.

3. The electric vehicle charger-mounted transformer according to claim 2, wherein the fire extinguisher operates in a set time after the power circuit is blocked.

4. The electric vehicle charger-mounted transformer according to claim 3, wherein each of the automatic fire extinguishing device operates by receiving power through the power circuit, and operates by receiving power from a separate rechargeable battery after the power circuit is blocked.

5. The electric vehicle charger-mounted transformer according to claim 1, wherein the given temperature is 70° C.

6. The electric vehicle charger-mounted transformer according to claim 1, wherein a fire extinguishing agent of the automatic fire extinguishing devices includes at least one of fluoride, chlorine, bromine, and iodine in an amount of 90% or more.

7. The electric vehicle charger-mounted transformer according to claim 1, wherein the automatic fire extinguishing devices are disposed inside a transformer enclosure, the electric vehicle charger is disposed inside or outside the transformer enclosure, and many air vents are provided in an upper part of a side of an enclosure of the electric vehicle charger.

8. The electric vehicle charger-mounted transformer according to claim 7, wherein a height of the air vents is 10 to 30 mm and a lateral width of the air vents is 50 to 200 mm.

9. The electric vehicle charger-mounted transformer according to claim 2, wherein the power circuit is connected to a current backflow prevention diode, and a capacity of the current backflow prevention diode is 0.5 times or more a short-circuit current (Isc) and 0.6 times or more an open-circuit voltage (Voc).

10. The electric vehicle charger-mounted transformer according to claim 1, wherein a charging controller configured to control the power circuit and output power is disposed in each of the slow-charging device and the fast-charging device, the charging controller adjusts a charging speed and efficiency, and a current detector configured to block a current when an overcurrent occurs is further disposed.

11. The electric vehicle charger-mounted transformer according to claim 1, further comprising:

a visual display device configured to visually indicate an emergency; and an audio display device configured to provide audio guidance on the emergency.

12. The electric vehicle charger-mounted transformer according to claim 1, wherein the automatic communication device is also connected to an emergency recovery department through wired and/or wireless communication, and when at least one of the automatic fire extinguishing devices starts operating, the automatic communication device also starts operating to transmit a situation of a fire to the emergency recovery department.

13. The electric vehicle charger-mounted transformer according to claim 12, wherein, when a situation of a fire is transmitted to the emergency recovery department, location information of the place where the fire has occurred and navigation information indicating the route on which the emergency recovery department can arrive at the place of the fire in the shortest time are transmitted together.

* * * * *